United States Patent [19]

Ozawa et al.

[11] Patent Number: 5,055,755
[45] Date of Patent: Oct. 8, 1991

[54] DISTRIBUTION CONTROL APPARATUS

[75] Inventors: Katsuko Ozawa, Tokyo; Kazuhisa Gotoh, Yokohama; Tomohiro Murayama, Yokohama; Momoyo Tokuda, Yokohama; Satoshi Sumida, Yokohama; Tetsuo Suzuki, Yokohama, all of Japan

[73] Assignee: Kabushiki Kaisha Toshiba, Kawasaki, Japan

[21] Appl. No.: 529,571

[22] Filed: May 29, 1990

[30] Foreign Application Priority Data

| May 31, 1989 [JP] | Japan | 1-138856 |
| May 21, 1990 [JP] | Japan | 2-130898 |

[51] Int. Cl.$^5$ .................................. G05B 19/42
[52] U.S. Cl. .................. 318/568.11; 318/568.1; 318/568.22; 364/513; 901/9; 901/20; 901/15
[58] Field of Search ............ 318/560-646; 364/513, 168-173, 190-193; 901/3-23, 45-48

[56] References Cited

U.S. PATENT DOCUMENTS

| 4,221,997 | 9/1980 | Flemming | 364/513 X |
| 4,467,436 | 8/1984 | Chance et al. | 364/513 |
| 4,541,060 | 9/1985 | Kogawa | 364/513 |
| 4,547,858 | 10/1985 | Horak | 318/568.11 X |
| 4,602,345 | 7/1986 | Yokoyama | 364/513 |
| 4,604,561 | 8/1986 | Kamajima et al. | 318/561 X |
| 4,617,502 | 10/1986 | Sakaue et al. | 364/513 X |
| 4,663,726 | 5/1987 | Chand et al. | 364/474.31 X |
| 4,698,777 | 10/1987 | Toyoda et al. | 318/573 X |
| 4,833,624 | 5/1989 | Kuwahara et al. | 318/568.24 X |
| 4,836,742 | 6/1989 | Ishiguro et al. | 901/15 X |
| 4,878,002 | 10/1089 | Heatzig et al. | 318/568.13 X |
| 4,887,222 | 12/1989 | Miyake et al. | 364/513 |
| 4,897,586 | 1/1990 | Nakata et al. | 318/568.1 |
| 4,906,907 | 3/1990 | Tsuchihashi et al. | 318/574 X |

OTHER PUBLICATIONS

"Self Organizing Robots Based on Cell Structures—CEBOT", IEEE Catalog, No. 88TH0234-5, T. Fukuda et al., pp. 145-150, 1988.

*Primary Examiner*—Paul Ip
*Attorney, Agent, or Firm*—Oblon, Spivak, McClelland, Maier & Neustadt

[57] ABSTRACT

A plurality of distribution type controllers are provided for corresponding portions of an object to be controlled. One of the controllers, which has the lowest operation rate, executes control items relating to the entire object and the portions of the object, and the other controllers execute control items relating only to the portions of the object.

21 Claims, 15 Drawing Sheets

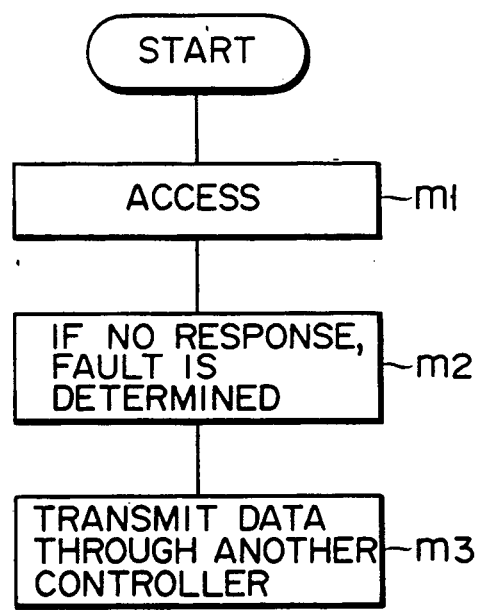
F I G. 23

DISTRIBUTION CONTROL APPARATUS

BACKGROUND OF THE INVENTION

1. Field of the Invention

The present invention relates to a distribution control apparatus for controlling the motion of an articulated manipulator, wherein distribution controllers are provided at the respective joints of the articulated manipulator.

2. Description of the Related Art

There is known a distribution control apparatus suitable for an articulated manipulator. The distribution control apparatus comprises a main CPU (Central Processing Unit), a motor control CPU, a communication control CPU, and an I/O (Input/Output) port control CPU. The motor control CPU, the communication control CPU and the I/O port control CPU are subordinate to the main CPU. The main CPU controls the overall operation of the articulated manipulator. The motor control CPU controls servomotors provided at the respective joints of the articulated manipulator. Namely, in the distribution control apparatus, the motor control, communication control, etc. are carried out distributively by corresponding CPUs.

A program, which is prepared on the basis of the operation of the articulated manipulator, is set in this distribution control apparatus. When the structure of the articulated manipulator is modified, the program must be rewritten and reset.

In addition, if any one of the CPUs malfunctions, this distribution control apparatus cannot control the articulated manipulator.

SUMMARY OF THE INVENTION

An object of the present invention is to provide a distribution control apparatus capable of efficiently controlling an object to be controlled.

Another object of the invention is to provide a distribution control apparatus capable of efficiently controlling an object to be controlled, wherein there is no need to change programs even if the object is changed.

Still another object of the invention is to provide a distribution control apparatus capable of continuing to control an object even if a fault occurs.

According to an aspect of this invention, there is provided a distribution control apparatus comprising a plurality of distribution type controllers provided for corresponding portions of an object to be controlled, each distribution type controller including: first control means having control items relating to said object and authorizing one of the distribution type controllers, which operates under the lowest load when the portions of the object are controlled, to control the object based on the control items; and second control means processed along with said first control means in a multiplexed manner, and having control items corresponding to the portions of the object to be controlled.

According to another aspect of the invention, there is provided a distribution control apparatus comprising: drive source controllers, provided for joints of an articulated manipulator, for controlling drive sources arranged in said joints; a working controller, provided at a distal end portion of the articulated manipulator, for controlling the operation of a working drive source for a working hand; an outside-state recognition sensor for recognizing the outside-state of the articulated manipulator an outside-state recognition controller for controlling the operation of the outside-state recognition sensor, and for transmitting data; and an input/output controller for controlling the input from the outside and the output to the outside, wherein each of said drive source controllers, the working controller, the outside-state recognition controller and the input/output controller includes: locus calculation means for calculating a locus of motion of the articulated manipulator, from the current position to a target position, by means of points set at predetermined intervals; interpolation calculation means for finding a variation of the angle of each joint between two adjacent ones of the points obtained by said locus calculation means; and calculation process shift means for detecting, at every operation cycle, the controller having the lowest operation rate, among the drive source controllers, the working controller, the outside-state recognition controller, and the input/output controller, and for authorizing the controller, found to have the lowest operation rate, to execute the locus calculation means and interpolation calculation means and to detect the controller having the lowest operation rate in the next operation cycle.

According to still another aspect of the invention, there is provided a distribution control apparatus comprising: drive source controllers provided for joints of an articulated manipulator and connected to each other through a redundant communication line, each drive source controller having a drive control program for controlling a drive source provided in each joint, each drive source controller reading out a drive source program for a servomotor provided in each joint thereby to control each drive source, each drive source controller including fault detecting/malfunctioning part fixing means for informing, when a fault has occurred in the drive source to be controlled or in the drive source controller itself, other one of the controllers of the occurrence of the fault, and fixing a movable part of the malfunctioning drive source or the drive source to be controlled by the malfunctioning drive source controller, fault countermeasure means for supplying, when informed by said other one of the controllers of the occurrence of the fault, drive degree data for compensating the stop of operation of the malfunctioning drive source to the drive source associated with said other one of the controllers, line-breakage-time data transmitting means for transmitting, at the time of breakage of the communication line, data through any one of the drive source controllers, and drive degree change means for changing the control drive degree for the drive source to be controlled by the associated drive source controller, in accordance with the type of the drive source; a working controller, provided at a distal end portion of the articulated manipulator, for controlling the operation of a working drive source for a working hand; an outside-state recognition sensor for recognizing the outside-state of the articulated manipulator; a outside-state recognition controller for controlling the operation of the outside-state recognition sensor, and for transmitting data; and an input/output controller for controlling the input from the outside and the output to the outside, wherein each of said drive source controllers, the working controller, the outside-state recognition controller and the input/output controller includes locus calculation means for calculating a locus of motion of the articulated manipulator, from the current position to a target position, by means of points set at predetermined intervals, interpolation calculation means for finding a variation of the angle of each joint between two adjacent ones of the points obtained by said locus calculation means and calculation process shift means for detecting, at every operation cycle, the controller having the lowest operation rate, among the drive source controllers, the working controller, the outside-state recognition controller, and the input/output controller, and for authorizing the controller, found to have the lowest operation rate, to execute the locus calculation means and interpolation calculation mean and to detect the controller having the lowest operation rate in the next operation cycle Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 23 is a flowchart for explaining a line-breakage-time data transmission program.

DETAILED DESCRIPTION OF THE PREFERRED EMBODIMENTS

Embodiments of the present invention will now be described with reference to the accompanying drawings.

Figure 1:
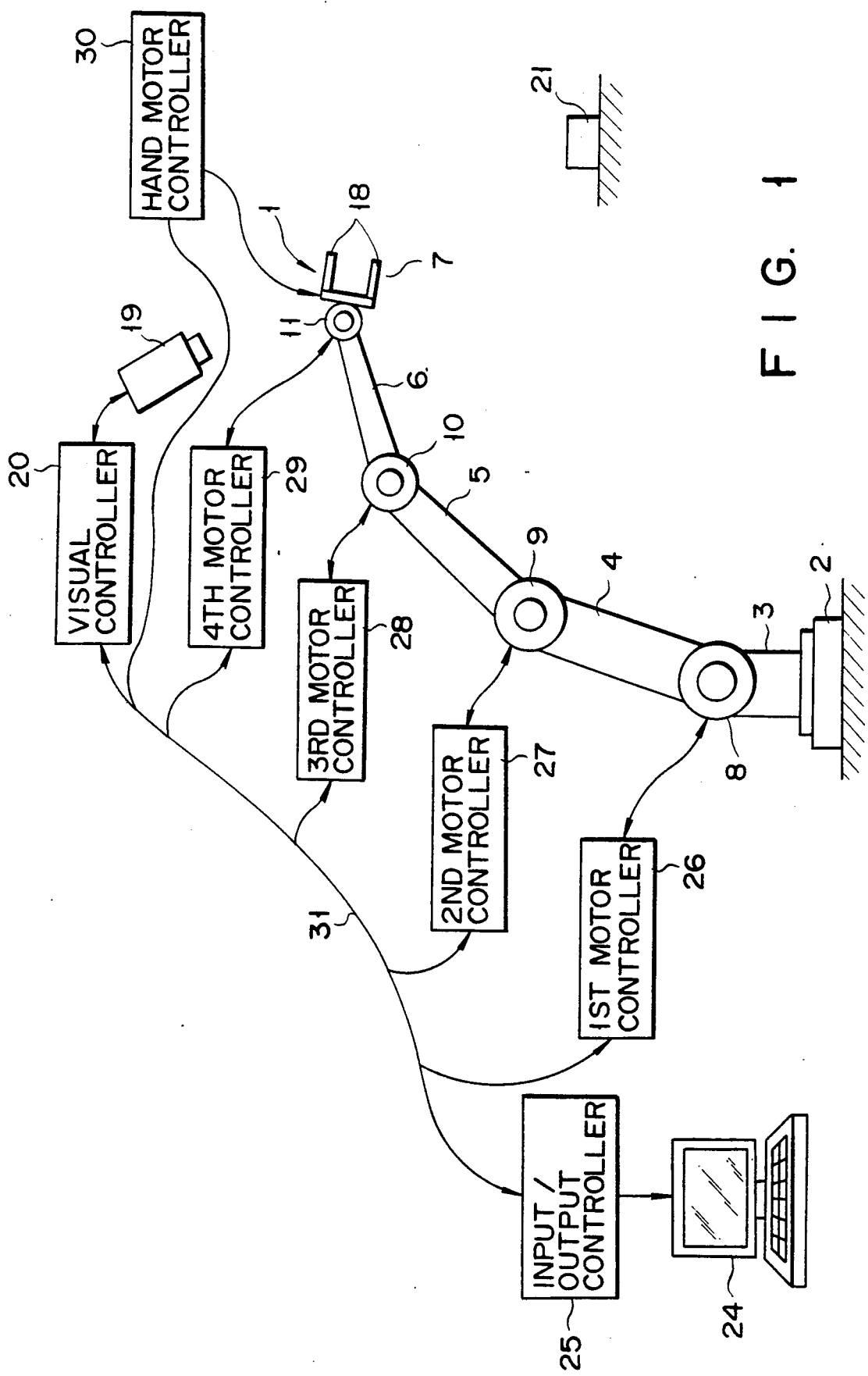
FIG. 1 shows a distribution control apparatus according to an embodiment of the present invention.

Referring to FIG. 1, an articulated manipulator 1 is mounted on a base 2. The manipulator 1 comprises a first arm 3, a second arm 4, a third arm 5, an fourth arm 6, and a hand 7. One end portion of the first arm 3 is secured to the base 2, and the other end portion of the first arm 3 is connected to the second arm 4 via a first joint 8. The second arm 4 is connected to the third arm 5 via a second joint 9. The third arm 5 is connected to the fourth arm 6 via a third joint 10. The fourth arm 6 is connected to the hand via a fourth joint 11.

Figure 2:
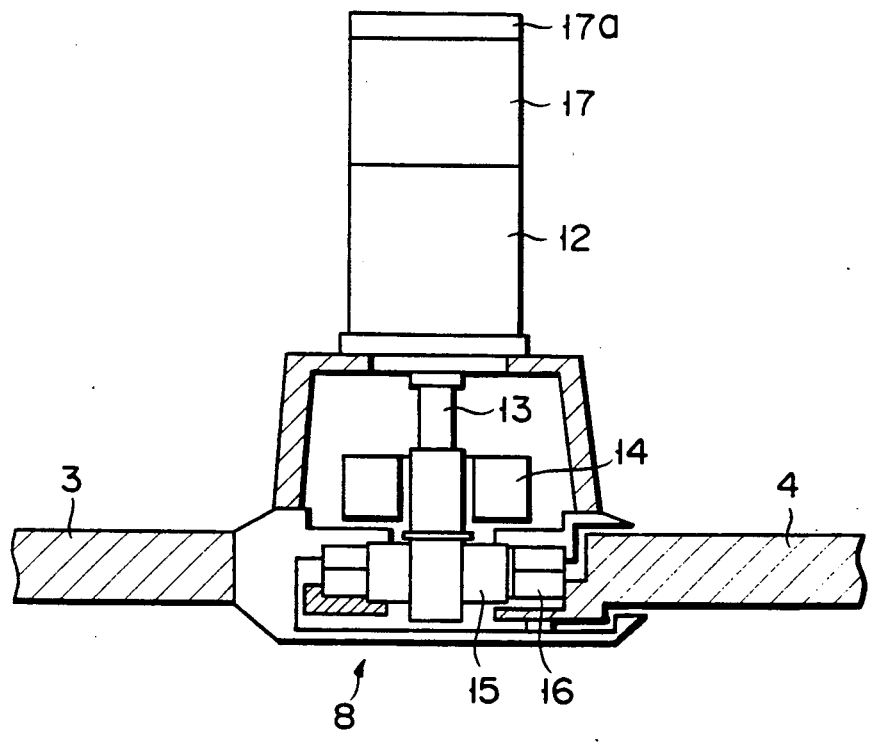
FIG. 2 shows a structure of a joint.

FIG. 2 shows the structure of each of the first to fourth joints 8, 9, 10, and 11. Since the first to fourth joints 8 to 11 have the same structure, the structure of the first joint 8 is representatively described. The first joint 8 is provided with a servomotor 12. An electromagnetic lock 14 and decelerators 15 and 16 are mounted on a rotational shaft 13 of the servomotor 12. An encoder 17 is coupled to the rotation shaft of the servomotor 12. A potentiometer 17a is attached to the encoder 17. Thus, the second arm 4 is moved in accordance with the rotation of the servomotor 12. When the servomotor attached to the second joint 9 having the same structure as that of the first joint 8 is rotated, the third arm 5 is moved. When the servomotor attached to the third joint 10 is rotated, the fourth arm 6 is moved when the servomotor attached to the fourth joint 11, the hand 7 is moved. By the rotation of servomotors provided in the hand 7, fingers 18 are opened and closed.

A visual sensor 19, which is an outside-state recognition sensor, is arranged above the articulated manipulator 1. The visual sensor 19 is an industrial TV camera. The image pickup operation of the visual sensor 19 is controlled by a visual controller 20 or an outside-state recognition controller. The visual controller 20 changes the image pickup direction of the visual sensor 19 and keeps the manipulator 1 or an object 21 of the manipulator 1 within the visual field of the visual sensor 19. The visual controller 20 outputs image signals of the articulated manipulator 1 or the object 1, based on image processing.

Further, there is provided a display 24 for receiving-/outputting data from /to the articulated manipulator 1. An input/output controller 25 controls data input/output between the manipulator 1 and the display 24.

The first to fourth joints 8, 9, 10, and 11 of the articulated manipulator 1 have first to fourth motor controllers 26 to 29. The hand 7 has a hand motor controller 30. The first to fourth motor controllers 26 to 29 control the servomotors in the respective joints. The hand motor controller 30 controls the servomotors in the hand 7.

The controllers 20 and 25 to 30 are mutually connected by a high-speed communication line 31.

The structures of the controllers 20 and 25 to 30 will now be described.

Figure 3:
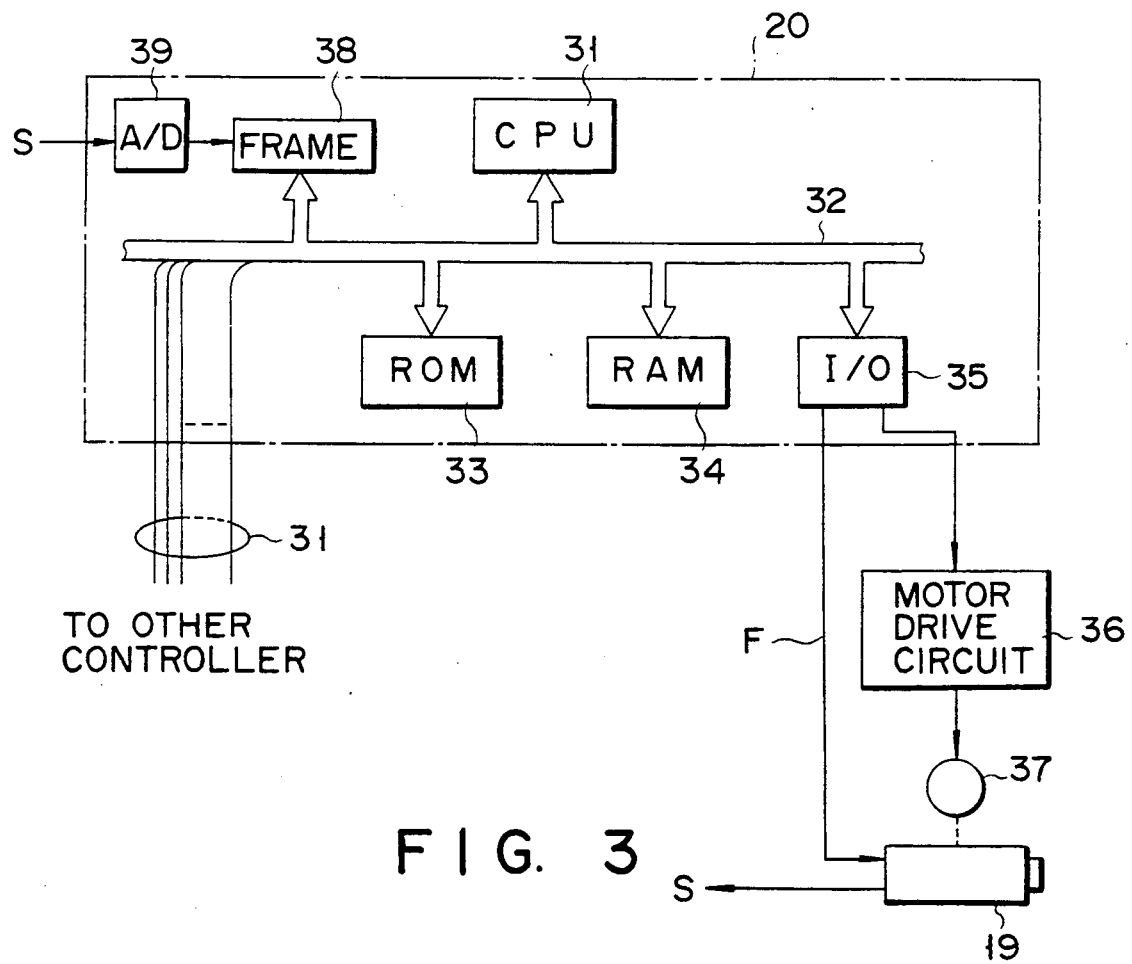
FIG. 3 shows a structure of a visual controller.
Figure 4:
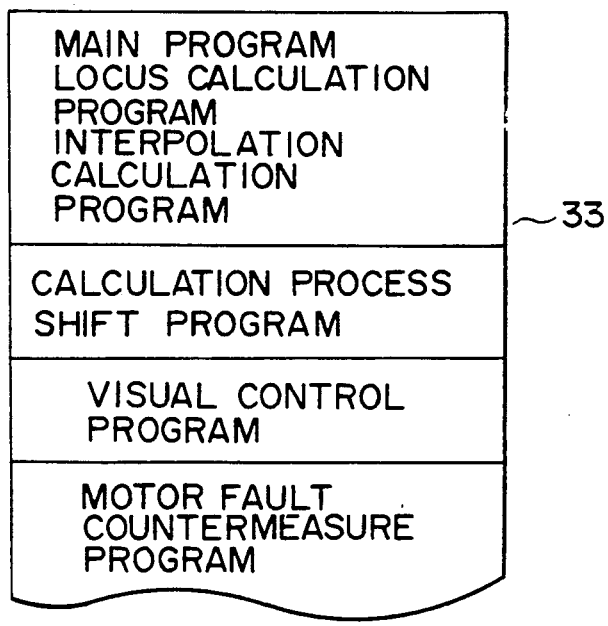
FIG. 4 shows a ROM structure in the visual controller.
Figure 5:
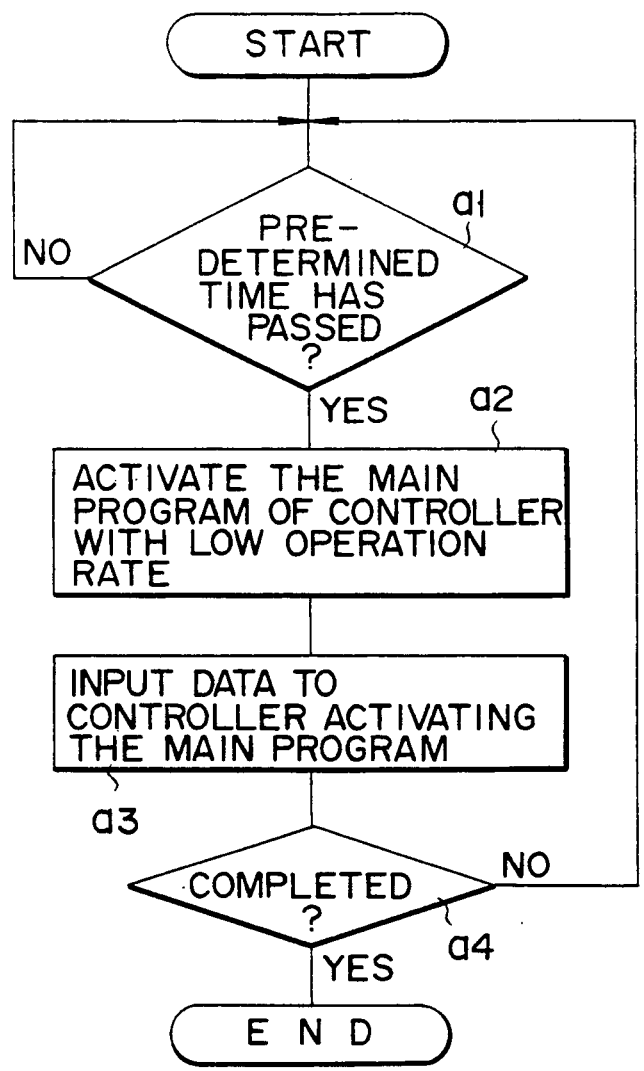
FIG. 5 is a flowchart for explaining a main program.

FIG. 3 shows the structure of the visual controller 20. A ROM 33, a RAM 34, an I/O port 35 and a frame memory 38 are connected to a CPU 31 over a bus 32. A motor drive circuit 36 is connected to the I/O port 35. The motor drive circuit 36 drives a motor 37 to change the image pickup direction of the visual sensor 19. An A/D converter circuit 39 is connected to the frame memory 38. The A/D converter circuit 39 receives an image signal S from the visual sensor 19. The ROM 33 stores programs shown in FIG. 4. As is illustrated in FIG. 5, a main program activates a locus calculation program and an interpolation calculation program, and also activates a calculation process shift program at predetermined intervals.

The locus calculation program is executed to calculate a locus of the articulated manipulator hand 7 from the current position to a target position, on the basis of points located at predetermined intervals.

The interpolation calculation program is executed to calculate a variation of the angle of each joint of the articulated manipulator 1, between adjacent two of the points of the locus obtained by the locus calculation program.

The calculation process shift program is executed to detect, at every operation cycle, the controller having the lowest operation rate, among the motor controllers 26 to 29, the hand motor controller 30, the visual controller 20, and the input/output controller 25. The controller found to have the lowest operation rate is authorized to perform the locus calculation and interpolation calculation and to detect the controller having the lowest operation rate in the next operation cycle. When the visual control program is executed, the visual controller 20 delivers an operation on/off signal F to the visual sensor 19 and changes the image pickup direction of the visual sensor 19. In addition, when the visual control program is executed, an image signal stored in the frame memory 38 is sent to the monitor of the display 24 through the high-speed communication line 31 and the input/output controller 25.

Figure 6:
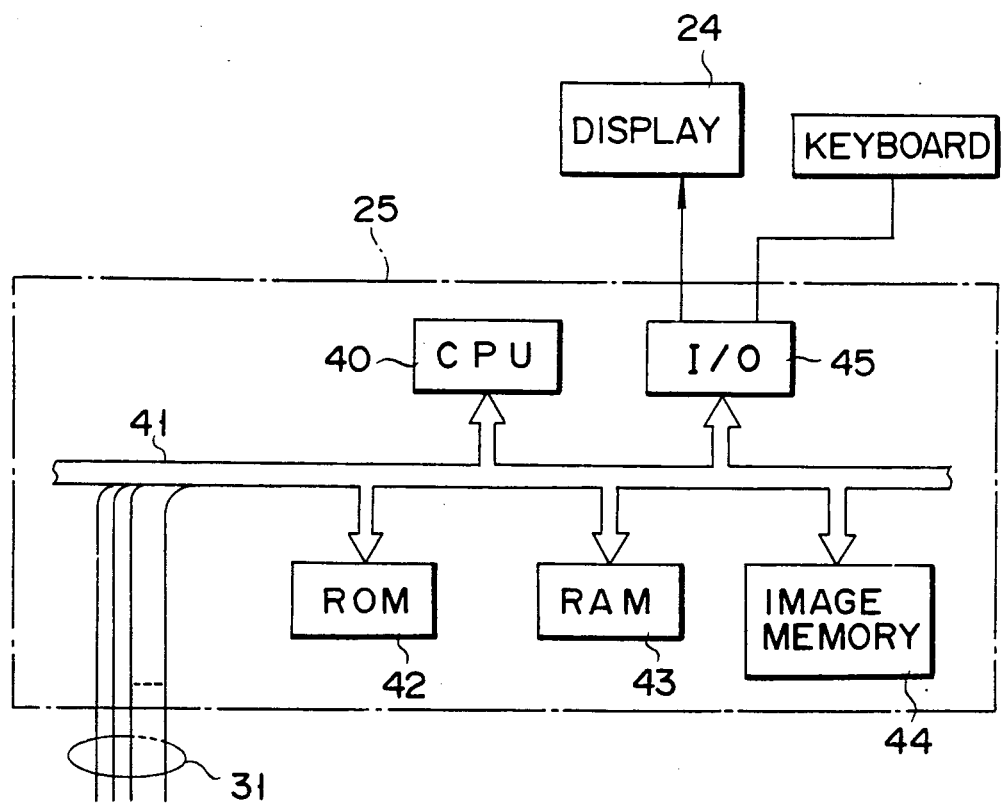
FIG. 6 shows a structure of a input/output controller.
Figure 7:
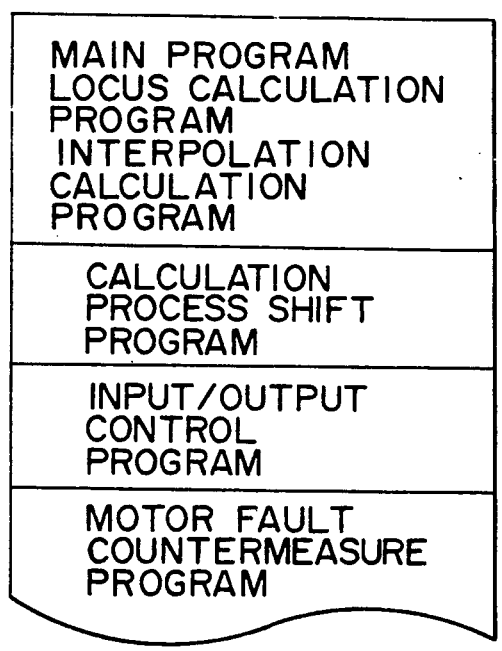
FIG. 7 shows a ROM structure in the input/output controller.
Figure 13:
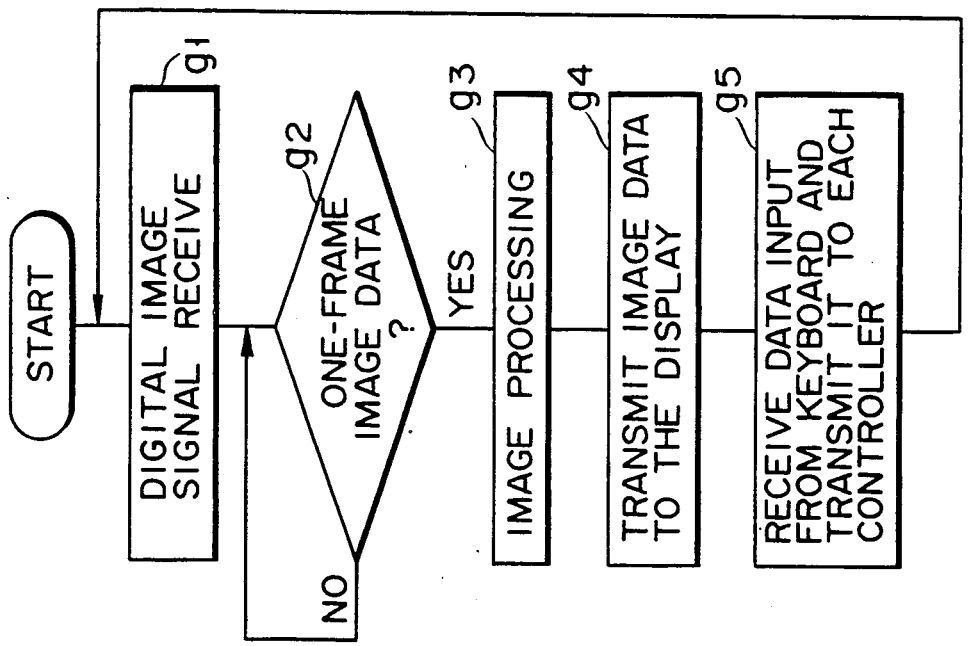
FIG. 13 is a flowchart for explaining an input/output control program.

FIG. 6 shows the structure of the input/output controller 25. A ROM 42, a RAM 43, an image memory 44 and an I/O 45 are connected to a CPU 49 over a bus 41. Data is input to and output from the display 24 through the I/O 45. The ROM 42 stores programs shown in FIG. 7. The main program, the locus calculation program, the interpolation program, and the calculation process shift program have been described above. As is shown in FIG. 13, an input/output program transmits image data stored in the image memory 44 to a monitor of the display 24, transmits each angle data to the display 24, and receives an instruction input from the keyboard of the display 24 and transmits the instruction to the controllers 20 and 25 to 30.

Figure 8:
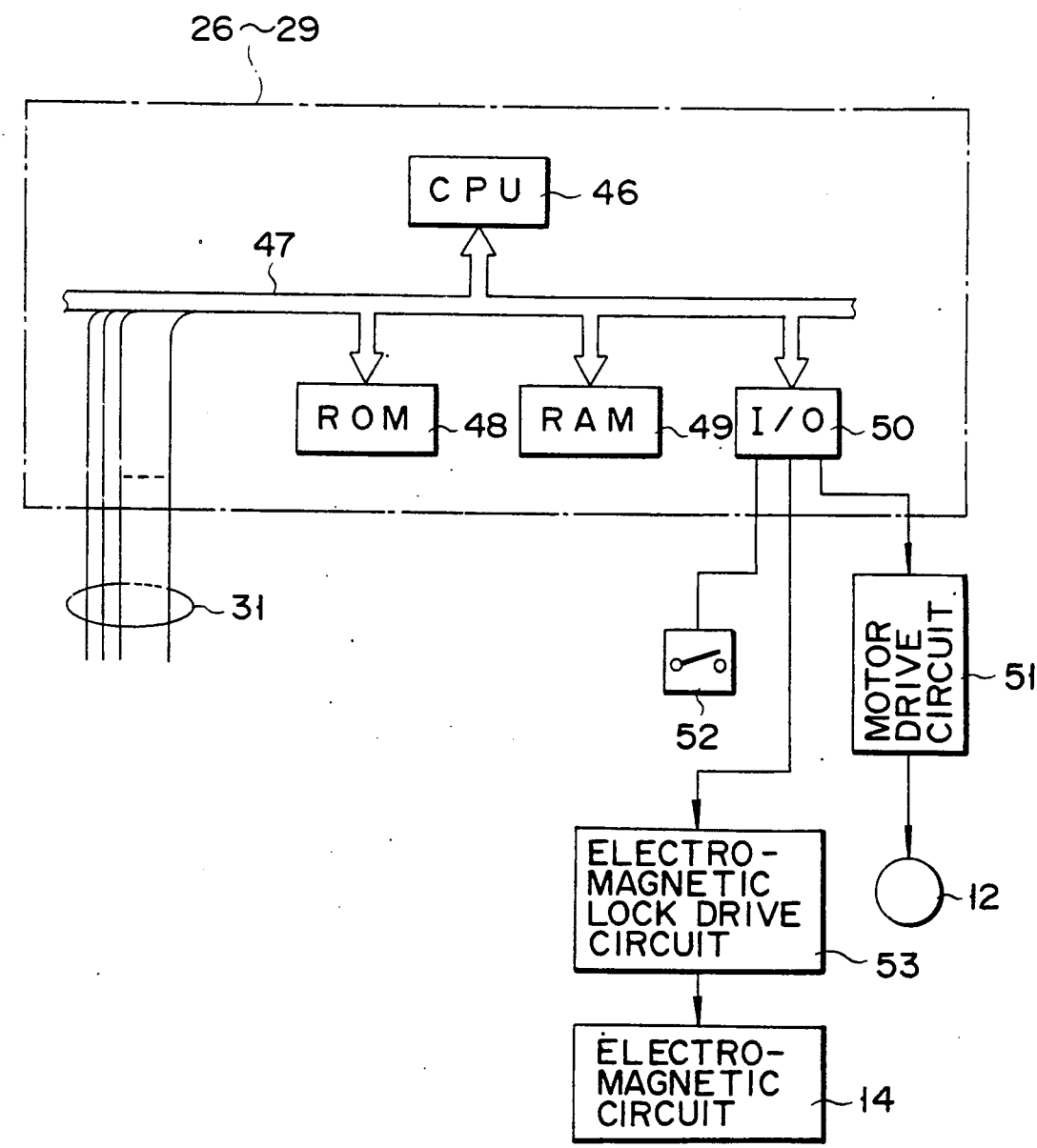
FIG. 8 shows a structure of a motor controller.
Figure 9:
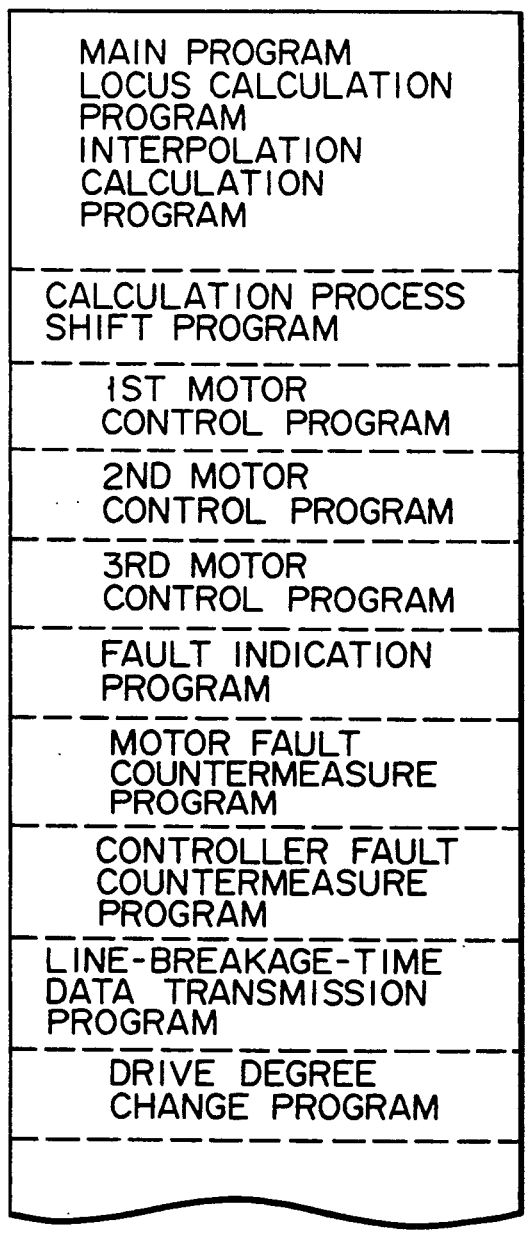
FIG. 9 shows a ROM structure in a motor controller.

FIG. 8 shows the structure of each motor controller, 26 to 29. A ROM 48, a RAM 49, and an I/O port 50 are connected to a CPU 46 over a bus 47. A motor drive circuit 51 a limit switch 52, and an electromagnetic lock drive circuit 53 are connected to the I/O port 50. The limit switch 52 limits the range of motion of each arm. The electromagnetic lock drive circuit 53 drives the electromagnetic lock 14 when it receives a lock command from the CPU 46 or a fault has occurred in the CPU 46. The ROM 48 stores programs shown in FIG. 9. The main program, the locus calculation program, the interpolation calculation program and the calculation process shift program have been described above.

Based on a first motor control program, drive control signals representative of drive degree, drive speed and drive direction are generated, which are input to the servomotor 12 in the first joint 8 when the articulated manipulator 1 conveys the object 21.

Based on a second motor control program, drive control signals representative of drive degree, drive speed and drive direction are generated, which are input to the servomotor in the second joint 9 when the articulated manipulator 1 conveys the object 21.

Based on a third motor control program, drive control signals representative of drive degree, drive speed and drive direction are generated, which are input to the servomotor in the third joint 10 when the articulated manipulator 1 conveys the object 21.

Based on a fourth motor control program, drive control signals representative of drive degree, drive speed and drive direction are generated, which are input to the servomotor in the fourth joint 11 when the articulated manipulator 1 conveys the object 21.

A fault indication program is executed to output, when a fault occurs in the servomotor, a lock command to the electromagnetic lock 14 and tell the fault to the motor controllers associated with the other servomotors.

According to a motor fault countermeasure program, signals representative of the drive degree, drive speed and drive direction, which compensate the function of the servomotor in which a fault occurred, are supplied to the servomotors which normally function.

According to a controller fault countermeasure program, when a fault occurred in other motor controller, an angle of the malfunctioning servomotor is detected, and signals representative of the drive degree, drive speed and drive direction, which compensate the function of the servomotor in which the fault occurred, are supplied to the servomotors which normally function.

According to a line-breakage-time data transmission program, when the high-speed communication line 31 is broken, data is transmitted through any one of the motor controllers.

A drive degree change program is executed to change the drive degree for the servomotors driven by the motor controllers, in accordance with the type of the motors.

As has been described above, the first to fourth motor controllers 26 to 29 have the same structure.

Figure 10:
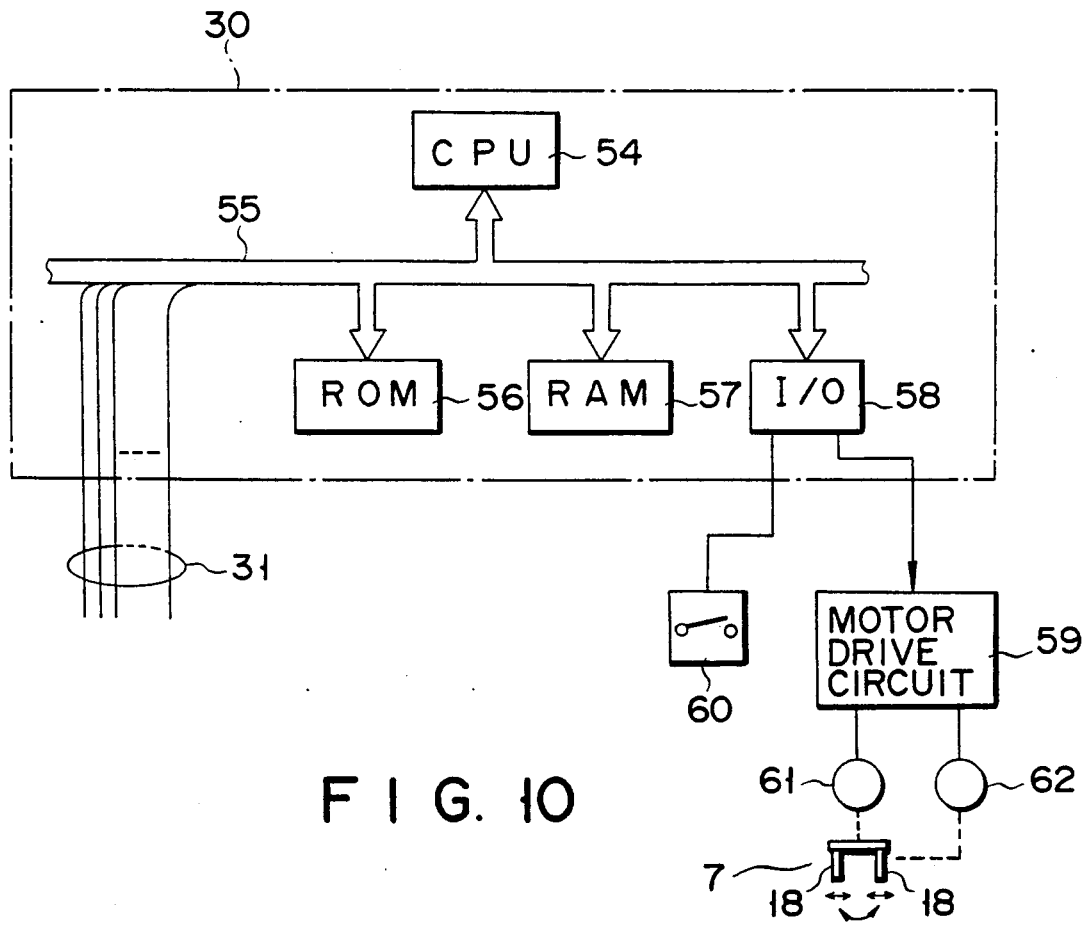
FIG. 10 shows a structure of a hand motor controller.
Figure 11:
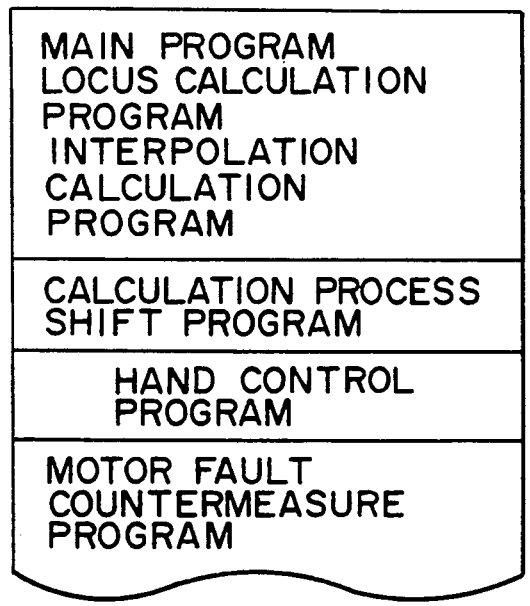
FIG. 11 shows ROM structure in the hand motor controller.

FIG. 10 shows the structure of the hand motor controller 30. A ROM 56, a RAM 57, and an I/O port 58 are connected to a CPU 54 over a bus 55. A motor drive circuit 59 and a limit switch 60 are connected to the I/O port 58. The limit switch 60 limits the range of motion of the hand 7 and the fingers 18. The ROM 56 stores programs shown in FIG. 11. The main program, the locus calculation program, the interpolation program and the calculation process shift program have been described above.

A hand control program controls servomotors 61 and 62 provided in the hand 7. The servomotor 61 is controlled so as to reduce to zero the departure of the direction of the hand 7 in relation to the position of the object 21. The servomotor 62 is controlled so as to open and close the fingers 18 and keep constant the hold force of the fingers 18 with which the object 21 is held.

The operation of the apparatus having the above structure will now be described.

The hand motor controller 30 is initially set to activate the main program. Thus, the other controllers do not execute the main program.

Figure 12:
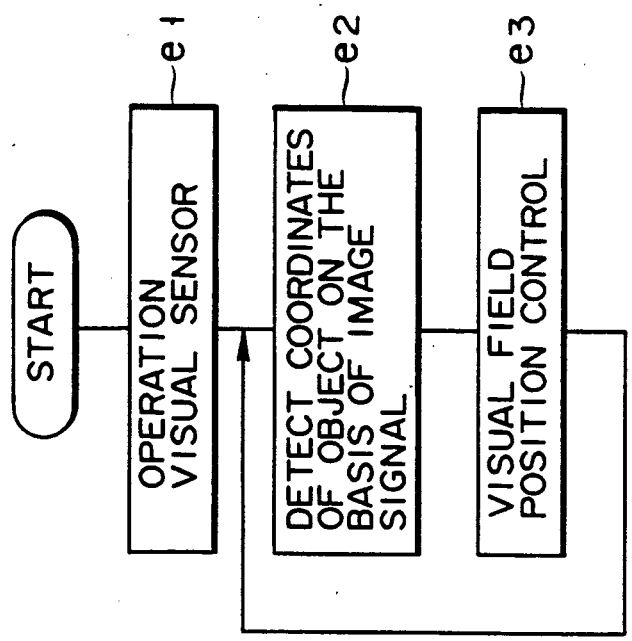
FIG. 12 is a flowchart for explaining a visual control program.

The CPU 31 in the visual controller 20 reads out the visual control program from the ROM 32 and executes this program. In step e1 in FIG. 12, the CPU 31 starts the operation of the visual sensor 19. The visual sensor 19 takes an image of the object 21 and outputs a corresponding image signal. The image signal is converted to a digital signal by the A/D converter circuit 39 in the visual controller 20, and the digital signal is stored in the frame memory 38. In step e2, the CPU 31 detects coordinates of an object (object 21 or hand 7 of manipulator 1) based on the digital image signal. In the subsequent step e3, the CPU 28 directs the visual field of the visual sensor 19 to the detected coordinates.

The hand motor controller 30 executes the main program and the locus calculation program in parallel processing. When the CPU 54 of the hand motor controller 30 executes the main program, the CPU 54 detects, after a predetermined time period (step a1 in FIG. 5), the controller 20, 25, 26, 27, 28, 29, or 30 having the lowest operation rate (step a2).

Figure 14:
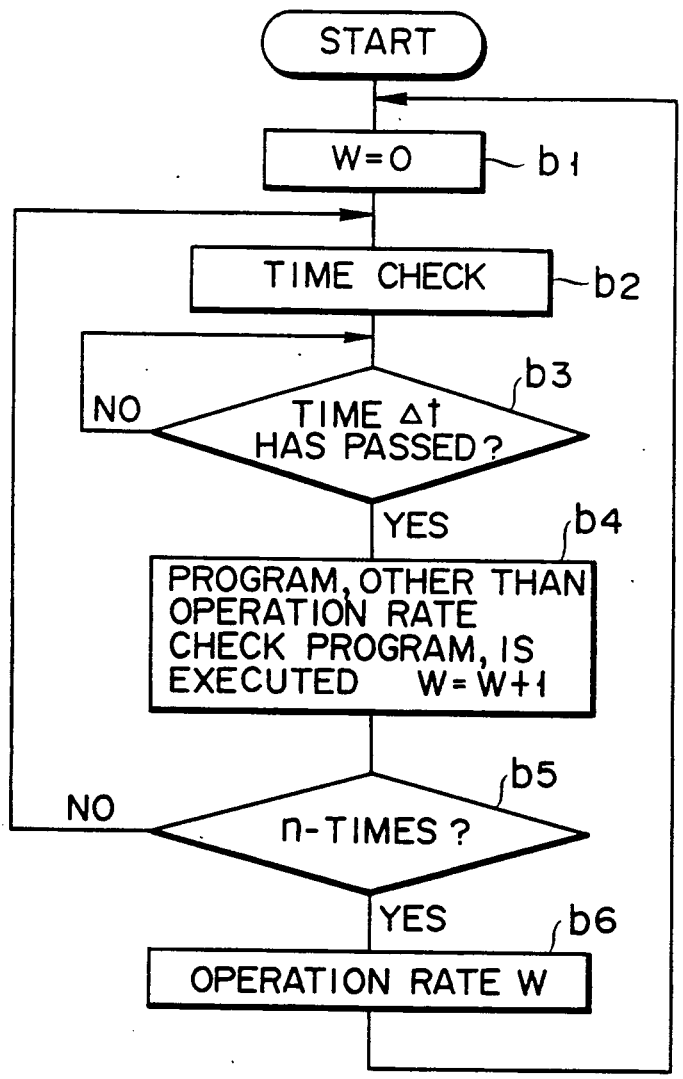
FIG. 14 is a flowchart for explaining a calculation process shift program.
Figure 15:
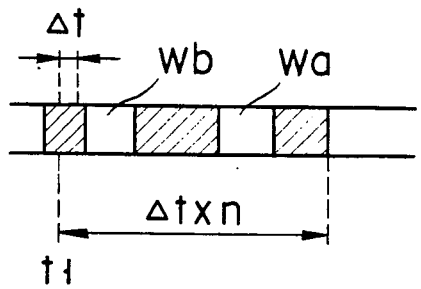
FIG. 15 is a diagram showing an operation rate calculation period

The operation rate is found by the calculation process shift program. The CPU 54 sets the operation rate W to zero (step b1 in FIG. 14) and then checks time (step b2). It is determined whether or not a time period Δt has passed (step b3). As shown in FIG. 15, the CPU 54 starts a time check at a time t1 and, after the passing of time period Δt, determines whether any program, other than the operation rate check program, has been executed. If the program, other than the operation rate check program, has been executed, "1" is added to the operation rate W. In the subsequent step b5, the CPU 54 determines whether the determination of the execution of other program than the operation rate check program has been done n-times, that is, whether a time period Δn has passed. If "YES" in step b5, the CPU 54 finds the operation rate W. FIG. 15 shows a time period Wa in which the operation rate check program is executed, and a time period Wb in which a program other than the operation rate check program is executed. The CPU 54 finds the operation rates of all controllers 20 and 25 to 30.

The CPU 54 returns to the main program, and detects the controller with lowest operation rate among the controllers 20 and 25 to 30 (step a3). If the detected controller is the hand motor controller 30, the CPU 54 continues to execute the main program, the locus calculation program, and interpolation calculation program.

The CPU 54 executes the main program and the locus calculation program in parallel.

Figure 16:
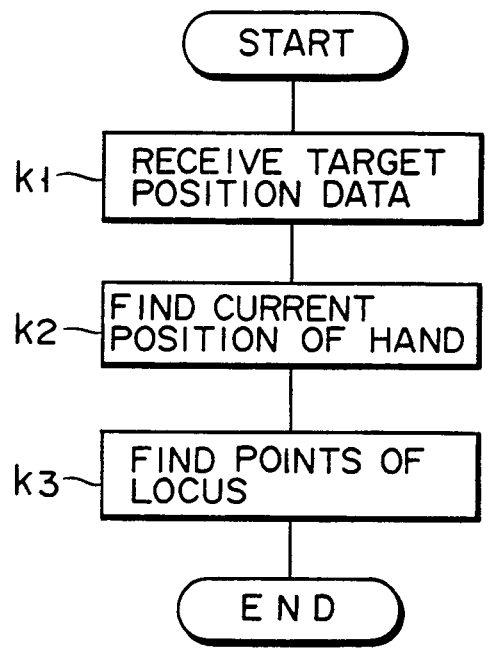
FIG. 16 is a flowchart for explaining a locus calculation program.
Figure 17:
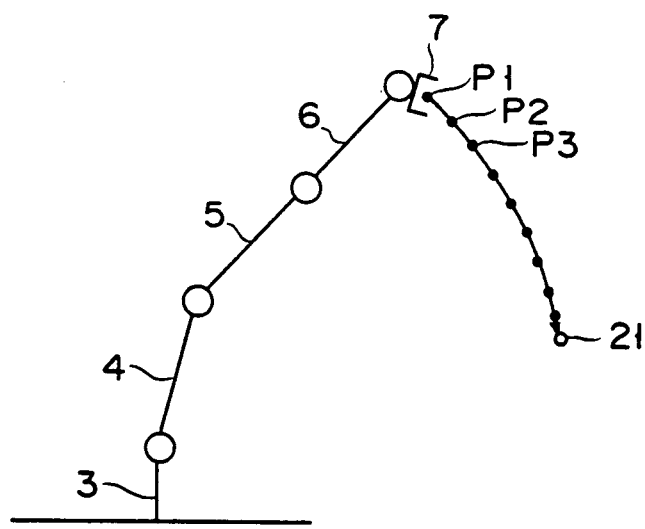
FIG. 17 shows points in a locus of motion.
Figure 18:
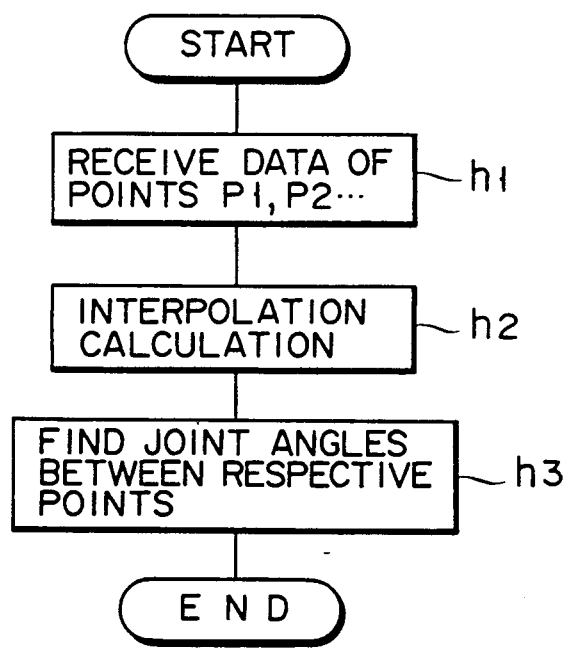
FIG. 18 is a flowchart for explaining an interpolation calculation program.

In step k1 in FIG. 16, the CPU 54 receives target position data from the input/output recognition controller 25. In step k2, the CPU 54 finds the current position of the hand 7. The current position of the hand 7 is calculated from the angles of the joints 8 to 11. In step k3, the CPU 54 finds a locus of motion of the hand 7 on the basis of the target position and the current position of the hand 7. As is shown in FIG. 17, the locus of motion is described by points P1, P2...set in predetermined time intervals. In addition, the CPU 54 executes the interpolation calculation program. In step h1 in FIG. 18, the CPU 54 receives data of points P1, P2...of the locus of motion. In step h2, the CPU 54 executes interpolation calculation to obtain data of joint angles (rotational angles of servomotors) between points P1 and P2, points P2 and P3, points P3 and P4.... The CPU 54 sends the data of the joint angles sequentially to the first to fourth motor controllers 26 to 29.

Figure 19:
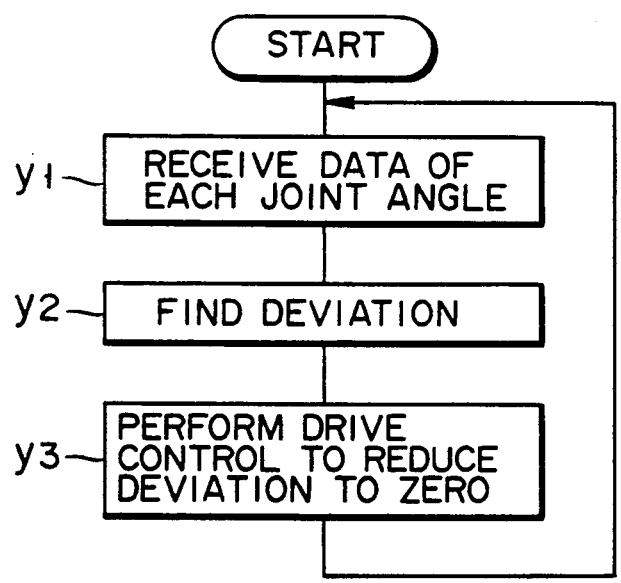
FIG. 19 is a flowchart for explaining a motor control program.

The first to fourth motor controllers 26 to 29 perform the following operations. The CPU 46 in the first motor controller 26 reads out the first motor control program from the ROM 48 and executes this program. In step y1 in FIG. 19, the CPU 46 receives data of joint angles sequentially. In step y2, the CPU 46 finds a deviation between the target position data and the angular position data of the servomotor, which is supplied from the encoder 17. In step y3, the CPU 46 produces drive control signals representative of the drive degree, drive speed and drive direction for the servomotor 12, whereby the deviation is reduced to zero. The drive control signals are fed to the motor drive circuit 51. Thus, the servomotor 12 is driven on the basis of the drive degree, drive speed and drive direction represented by the drive control signals. As has been described above, the encoder 17 detects the rotational degree and rotational direction of the servomotor 12 and feeds the data representative of the rotational degree and rotational direction back to the first motor controller 26. The output from the encoder 17 is converted by the potentiometer 17a to a signal which is easily processed by the CPU. Once again, the CPU 46 produces drive control signals so that the deviation between the fed-back data of the rotational degree an rotational direction, on the one hand, and the set data of the rotational degree and rotational direction, on the other, can be reduced to zero.

In like manner, the second to fourth motor controllers 27 to 29 control the driving of the servomotors in the joints 9 and 10. In this way, the hand 7 is moved towards the object 21.

The operation, when a fault has occurred, will now be described.

Figures 20, 21:
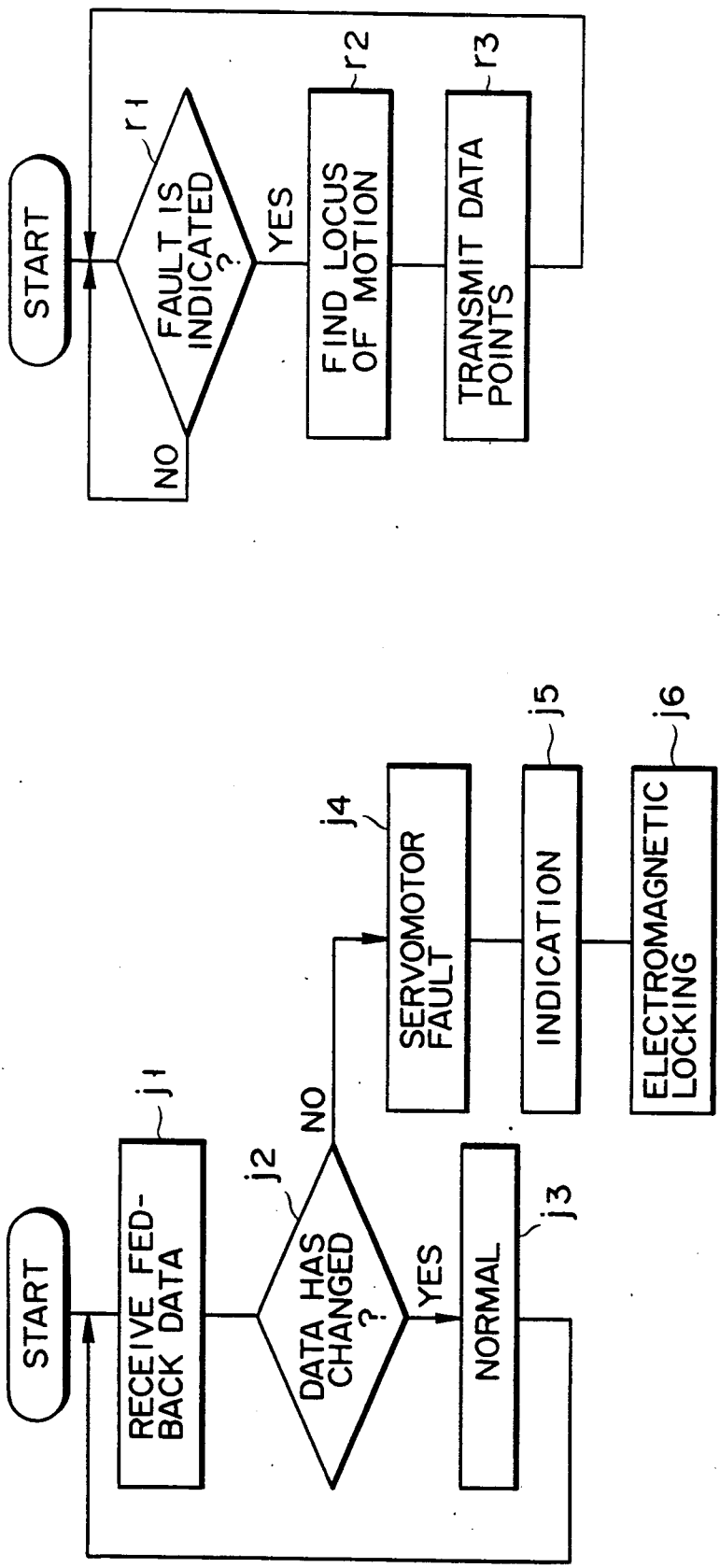
FIG. 20 is a flowchart for explaining a fault alarm program.
FIG. 21 is a flowchart for explaining a motor fault elimination program.

Suppose that a fault has occurred in the servomotor 12 in the first joint 8. The CPU 46 of the first motor controller 26 reads out the fault indication program from the ROM 48 in every predetermined cycle, and executes this program. In step j1 in FIG. 20, the CPU 46 receives fed-back data from the encoder. If the fed-back data of drive degree and drive direction has changed, the CPU 46 determines that the servomotor 12 functions normally (step j2). If the fed-back data has not changed, the CPU 46 determines that the servomotor 12 malfunctions. In this case, the CPU 46 informs the controllers 20 and 25 to 30 of the fault of the servomotor 12 (step j5). In step j6, the CPU 46 operates the electromagnetic lock 14 to lock the motion of the first arm 3. At the same time the CPU 46 finds the lock angle of the second arm 4 with respect to the locked first arm 3. The lock angle is calculated from the data of drive degree and drive direction, fed back from the encoder 17.

As has been described above, the CPU 54 of the hand motor controller 30 executes the main program, locus calculation program, interpolation calculation program and calculation process shift program. The CPU 54 executes the motor fault countermeasure program in every predetermined cycle. In step r1 in FIG. 21, when the CPU 54 is informed of the fault of the servomotor 12, the CPU 54 finds a locus of motion, along which the hand 7 will be moved to the target position by the operation of the second to fourth joints 9 to 11 (step r2). As shown in FIG. 17, the locus of motion is described by points set at predetermined intervals. The locus of motion varies depending on the lock angle of the second arm 4. In step r3, the CPU 54 sequentially transmits the data of each point to the second and fourth controllers 27 to 29. Thus, the second and fourth motor controllers 27 to 29 receive the data of each point sequentially. Based on the data of the points, the second and fourth motor controllers 27 to 29 calculate data of drive degree, drive speed and drive direction, whereby the hand 7 is moved to the target position. As a result, the hand 7 is moved towards the object 21 by the operation of the second to fourth joints.

Suppose that a fault has occurred in the second motor controller 27.

Figure 22:
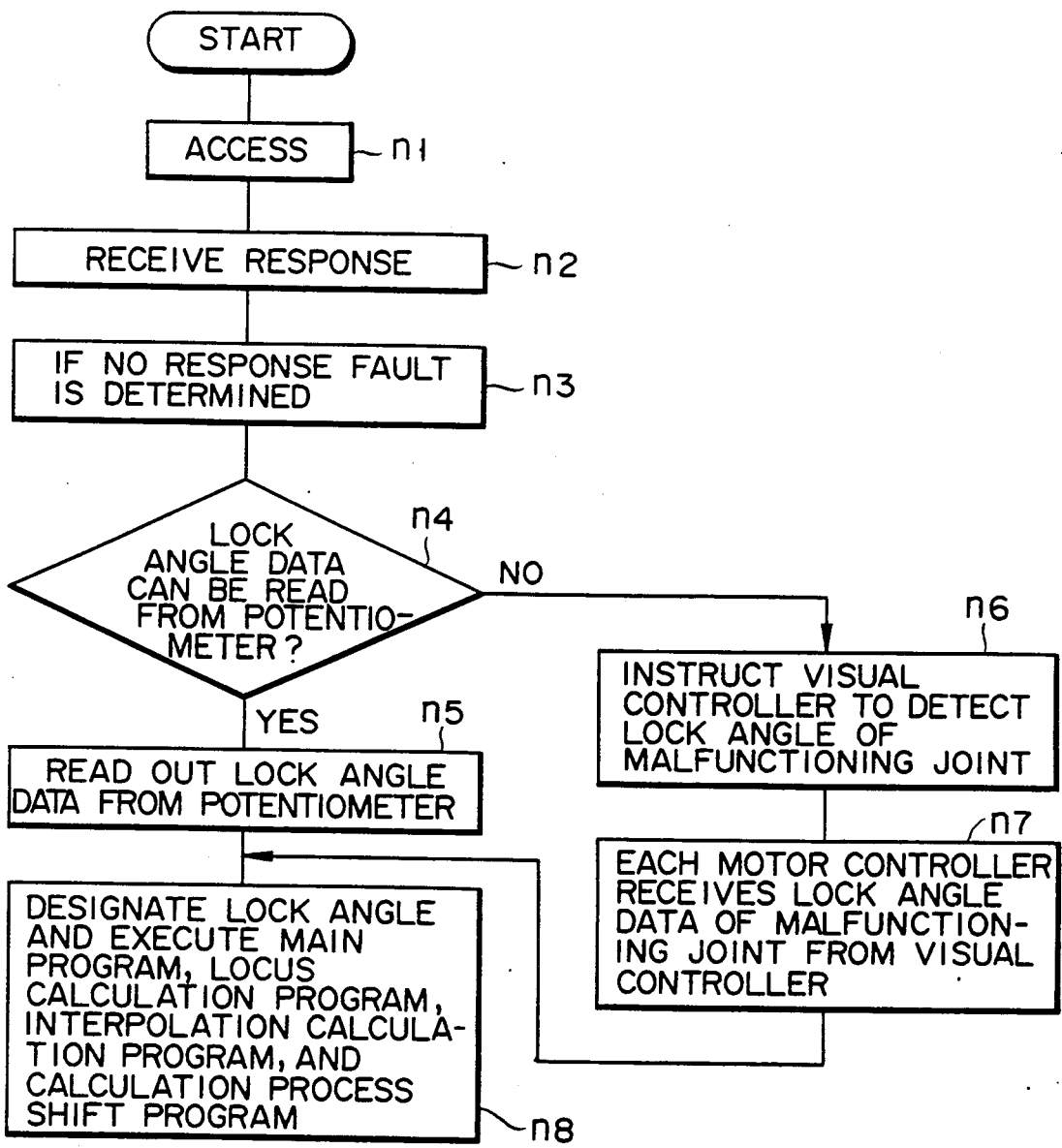
FIG. 22 is a flowchart for explaining a controller fault elimination program.

The CPU in each of the motor controllers 26 to 29 executes the controller fault countermeasure program in every predetermined cycle. In step n1 in FIG. 22, the CPUs access each other. If the CPU of the motor controller 27, 28 or 29 does not receive a response to the access from the controller accessed, this CPU determines a fault in the accessed CPU or a line breakage of the high-speed communication line 31.

When a fault has occurred in the CPU, the electromagnetic lock drive circuit 53 detects the fault of the CPU from the aspect of the hardware and drives the electromagnetic lock 14, thereby fixing the joint 9. Also, the fault of the CPU can be detected since it does not output a response to the access from the other CPUs. When the fault of the second motor controller 27 is detected, the CPUs of the first, third and fourth motor controllers 26, 28 and 29 determine whether lock angle data can be read out from the potentiometer 17a of the second joint. If the lock angle data can be read out, this data is read out from the encoder of the second joint (step n5). If the second motor controller 27 malfunctions so seriously that the lock angle data cannot be read out from the encoder of the second joint, a command is input to the visual controller 20 to detect the lock angle of the second joint (step n6). The visual controller 20 detects the lock angle of the second joint, on the basis of the image signal and the joint angle data obtained from the first, third and fourth motor controllers 26, 28 and 29, and the visual controller 20 tells the detected lock angle to each motor controller. In step n7, each motor controller receives the data of the lock angle of the second joint. Once the lock angle is received, the lock angle is fixed and the hand motor controller 30 resets the main program, locus calculation program, interpolation calculation program, and the calculation process shift program.

A description will now be given of the case where the high-speed communication line 31 been broken between the first and second motor controllers 26 and 27.

As has been described above, the motor controllers 26 to 29 access each other in every predetermined cycle. Based on this access, each controller, 26 to 29, determines the line breakage of the high-speed communication line 31. When the first motor controller 26 determines the breakage of the communication line 31 between the first and second motor controllers 26 and 27, the first controller 26 transfers data to the third motor controller 28 (step m3 in FIG. 23). The destination of the transferred data is set to the second motor controller 27. Once the third motor controller 28 receives the data, the data is supplied to the second motor controller 27 in accordance with the set destination of data.

The present invention is not limited to the above embodiments, and various changes and modifications may be made within the scope of the subject matter of the invention. For instance, this invention is applicable to a manipulator in a nuclear power plant, or to equipment situated in space or in a clean room.

Additional advantages and modifications will readily occur to those skilled in the art. Therefore, the invention in its broader aspects is not limited to the specific details, and representative devices, and illustrated examples shown and described herein. Accordingly, various modifications may by without departing from the spirit or scope of the general inventive concept as defined by the appended claims and their equivalents.

What is claimed is:

1. A distribution control apparatus comprising:
   a plurality of distribution controllers provided for each of a plurality of portions of an object to be controlled, wherein each of said distribution controllers executes a program controlling each of said plurality of portions and wherein one of said distributions controllers serves as a main controller and each of said distribution controllers comprises:
   control means for performing control operations with respect to said portions;
   detecting means for detecting one of said distribution controllers whose program execution time is shortest;
   means for causing said one distribution controller detected by said detecting means to serve as the main controller.

2. A distribution control apparatus for an articulated manipulator comprising:
   a plurality of drive source controllers for controlling a plurality of drive sources arranged in a plurality of corresponding joints of said articulated manipulator;
   a manipulator hand controller, provided at a distal end portion of said articulated manipulator, for controlling an operation of a drive source for said manipulator hand;
   a visual sensor for sensing an image of said articulated manipulator;
   a visual controller for controlling an operation of said visual sensor, and for transmitting data; and
   an input/output controller for controlling the input of data to each of said controllers and the output of data from each of said controllers,
   wherein each of said plurality of drive source controllers, said manipulator hand controller, said visual controller and said input/output controller includes program execution means comprising:
   locus calculation means for calculating a locus of motion of the articulated manipulator, from a current position to a target position, by means of points set at predetermined intervals;
   interpolation calculation means for calculating a variation of an angle of each of said plurality of joints between two adjacent ones of said points obtained by said locus calculation means; and
   calculation process shift means for detecting, at every one of a plurality of operation cycles one of said controllers having a lowest program execution rate from among said drive source controllers, said manipulator hand controller, said visual controller, and said input/output controller, and for activating said controller detected to have said lowest program execution rate during a first operation cycle to execute said locus calculation means and said interpolation calculation means and to detect one of said controllers having the lowest program execution rate in an operation cycle following said first operation cycle.

3. The apparatus according to claim 2, wherein said drive source is a servomotor.

4. The apparatus according to claim 2, wherein said drive source is a pulse motor.

5. The apparatus according to claim 2, wherein said drive source is an actuator.

6. The apparatus according to claim 2, wherein said working drive source is a servomotor.

7. The apparatus according to claim 2, wherein said working drive source is a pulse motor.

8. The apparatus according to claim 2, wherein said working drive source is an actuator.

9. The apparatus according to claim 2, wherein said visual sensor is an industrial TV camera.

10. The apparatus according to claim 2, wherein said visual sensor is a solid image-pickup device.

11. The apparatus according to claim 2, wherein said calculation process shift means determines said program execution rate of said controller having said lowest program execution rate, on the basis of a ratio of an operation rate calculation time during said operation cycles to a time in which at least said locus calculation means and said interpolation calculation means are activated.

12. A distribution control apparatus comprising:
a plurality of drive source controllers provided for controlling a plurality of corresponding drive sources in a plurality of corresponding joints of an articulated manipulator and connected to each other through a redundant communication line, each drive source controller comprising a drive control program for controlling a corresponding drive source provided in a corresponding joint, each drive source controller reading out a drive source program for a servomotor provided in each corresponding joint thereby controlling each drive source, each drive source controller including, fault detecting/malfunctioning part fixing means for informing a first one of said drive source controllers of an occurrence of a fault, in a second drive source or in said drive source controller of said second drive source, and for fixing a movable part of said second drive source or said drive source controller of said second drive source.

fault countermeasure means for supplying drive degree data to said drive source associated with said first one of said drive source controllers to compensate for a stop of operation of said second drive source when informed by said first one of said drive source controllers of the occurrence of the fault, line-breaking-time data transmitting means for transmitting data through any one of the drive source controllers at a time when said redundant communication line is broken, and drive degree change means for changing a control drive degree for the drive source to be controlled by the associated drive source controller, in accordance with the type of the drive source;

a manipulator hand controller, provided at a distal end portion of said articulated manipulator, for controlling an operation of a drive source for a said manipulator hand;

a visual sensor for sensing an image of said articulated manipulator;

a visual controller for controlling an operation of said visual sensor, and for transmitting data; and an input/output controller for controlling the input of data to each of said controllers and the output of data from each of said controllers, wherein each of said plurality of drive source controllers, said manipulator hand controller, said visual controller and said input/output controller includes:

locus calculation means for calculating a locus of motion of the articulated manipulator, from a current position to a target position, by means of points set at predetermined intervals;

interpolation calculation means for calculating a variation of an angle of each of said plurality of joints between two adjacent ones of said points obtained by said locus calculation means; and calculation process shift means for detecting, at every one of a plurality of operation cycles one of said controllers having a lowest operation rate from among said drive source controllers, said manipulator hand controller, said visual controller, and said input/output controller, and for activating said controller detected to have the lowest operation rate during a first operation cycle to execute said locus calculation means and said interpolation calculation means and to detect one of said controllers having the lowest operation rate in an operation cycle following said first operation cycle.

13. The apparatus according to claim 12, wherein said drive source is a servomotor.

14. The apparatus according to claim 12, wherein said drive source is a pulse motor.

15. The apparatus according to claim 12, wherein said drive source is an actuator.

16. The apparatus according to claim 12, wherein said working drive source is a servomotor.

17. The apparatus according to claim 12, wherein said working drive source is a pulse motor.

18. The apparatus according to claim 12, wherein said working drive source is an actuator.

19. The apparatus according to claim 12, wherein said visual sensor is an industrial TV camera.

20. The apparatus according to claim 12, wherein said visual sensor is a solid image-pickup device.

21. The apparatus according to claim 12, wherein said calculation process shift means determines an operation rate of said controller having the lowest operation rate on the basis of a ratio of an operation rate calculation tine in said cycle to a time in which at least said locus calculation means and said interpolation calculation means are activated.

* * * * *